United States Patent
Hsieh et al.

(10) Patent No.: US 12,235,454 B1
(45) Date of Patent: Feb. 25, 2025

(54) HEAD-MOUNTED DISPLAY DEVICE AND DISPLAY METHOD FOR DISPLAYING A TOLERANCE-ENHANCED AND UNDISTORTED IMAGE

(71) Applicant: HTC Corporation, Taoyuan (TW)

(72) Inventors: Cheng Hsin Hsieh, Taoyuan (TW); Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/491,791

(22) Filed: Oct. 22, 2023

(51) Int. Cl.
*G06T 5/73* (2024.01)
*G02B 27/01* (2006.01)
*G02B 27/09* (2006.01)

(52) U.S. Cl.
CPC ..... *G02B 27/0172* (2013.01); *G02B 27/0955* (2013.01); *G06T 5/73* (2024.01); *G02B 2027/011* (2013.01); *G06T 2207/20081* (2013.01); *G06T 2207/20084* (2013.01)

(58) Field of Classification Search
CPC ............ G02B 27/0172; G02B 27/0955; G02B 2207/20081; G06T 5/73; G06T 2207/20081; G06T 2207/20084
See application file for complete search history.

(56) References Cited

U.S. PATENT DOCUMENTS

| | | | |
|---|---|---|---|
| 10,277,893 B1* | 4/2019 | Yoon | G02B 27/017 |
| 2010/0090929 A1* | 4/2010 | Tsujimoto | G06T 5/80 |
| | | | 382/167 |
| 2018/0286016 A1* | 10/2018 | Bar-On | G06T 5/70 |
| 2019/0056592 A1* | 2/2019 | Fenney | G02B 27/017 |

FOREIGN PATENT DOCUMENTS

| | | |
|---|---|---|
| CN | 114186673 | 3/2022 |
| CN | 115311154 | 11/2022 |
| WO | 2017120552 | 7/2017 |
| WO | 2019241667 | 12/2019 |

OTHER PUBLICATIONS

"Notice of allowance of Taiwan Counterpart Application", issued on Jul. 12, 2024, p. 1-p. 4.

* cited by examiner

*Primary Examiner* — Adam J Snyder
(74) *Attorney, Agent, or Firm* — JCIPRNET (57) ABSTRACT

A heads mounted display device is provided. The head-mounted display device includes a display, an optical system, and a processor. The display is configured to display a pre-warp image. The optical system is configured to receive the pre-warp image and output an undistorted image. The processor is configured to perform a tolerance enhancement operation on an original image to generate an enhanced image. Further, the processor is configured to apply a software distortion on the enhanced image to generate the pre-warp image. The software distortion is configured to compensate an optical distortion of the optical system.

20 Claims, 7 Drawing Sheets

HEAD-MOUNTED DISPLAY DEVICE AND DISPLAY METHOD FOR DISPLAYING A TOLERANCE-ENHANCED AND UNDISTORTED IMAGE

BACKGROUND

Technical Field

The disclosure relates to a head-mounted display device; particularly, the disclosure relates to a head-mounted display device and a display method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a head-mounted display device and a display method, so as to improve a quality of an image displayed to an user.

In this disclosure, a head-mounted display device is provided. The head-mounted display device includes a display, an optical system, and a processor. The display is configured to display a pre-warp image. The optical system is configured to receive the pre-warp image and output an undistorted image. The processor is configured to perform a tolerance enhancement operation on an original image to generate an enhanced image. Further, the processor is configured to apply a software distortion on the enhanced image to generate the pre-warp image. The software distortion is configured to compensate an optical distortion of the optical system.

In this disclosure, a display method for a head-mounted display device is provided. The display method includes: performing a tolerance enhancement operation on an original image to generate an enhanced image; applying a software distortion on the enhanced image to generate a pre-warp image, wherein the software distortion is configured to compensate an optical distortion of the optical system; displaying the pre-warp image; receiving the pre-warp image through an optical system; and outputting an undistorted image through the optical system.

Based on the above, according to the head-mounted display device and the display method, the undistorted image may be displayed to the user while the quality of the image does not reduce significantly, thereby improving the user experience.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

Lenses may be utilized to bring a comfort display experience to the user. However, the lenses may cause a distortion to an image display to the user. Even if the distortions may be reduced by applying an inverse of the distortion to the image, the quality of the image may be also reduced during the distortion and/or the inverse of the distortion. Therefore, it is the pursuit of people skilled in the art to display an undistorted image to the user while the quality of the image does not reduce significantly.

Figure 1:
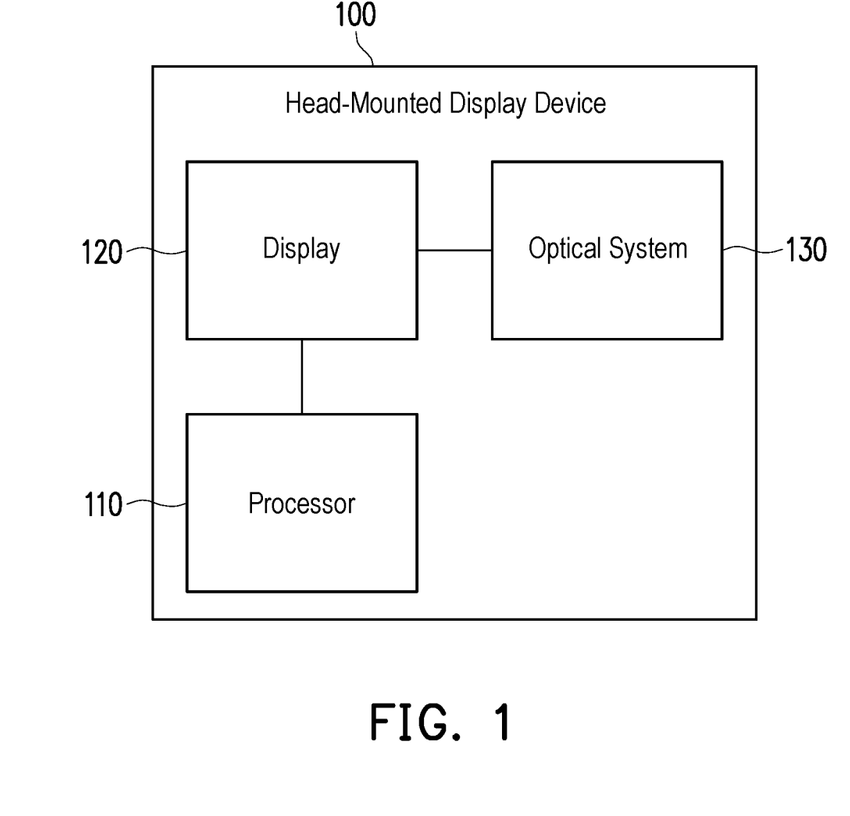
FIG. 1 is a schematic diagram of a hardware structure of a head-mounted display device according to an embodiment of the disclosure.

FIG. 1 is a schematic diagram of a hardware structure of a head-mounted display (HMD) device according to an embodiment of the disclosure. With reference to FIG. 1, a hardware structure of an HMD device 100 may include a processor 110, a display 120, and an optical system 130. The processor 110 may be coupled to the display 120. The display 120 may be further coupled to the optical system 130.

In one embodiment, the display 120 may be configured to display a pre-warp image. The optical system 130 may be configured to receive the pre-warp image and output an undistorted image. The processor 110 may be configured to perform a tolerance enhancement operation on an original image to generate an enhanced image. Further, the processor 110 may be configured to apply a software distortion on the enhanced image IMG_E to generate the pre-warp image. Moreover, the software distortion may be configured to compensate an optical distortion of the optical system 130.

In this manner, since the original image is enhanced by the tolerance enhancement operation, the quality of the image displayed to the user (i.e., the undistorted image) may be almost the same as the quality of the original image. That is, the undistorted image may be displayed to the user while the quality of the image does not reduce significantly, thereby improving the user experience.

In one embodiment, the HMD device 100 may be configured to display content of augmented reality (AR), virtual reality (VR), mixed reality (MR), or Extended Reality (XR). The HMD device 100 may include, for example, a headset, wearable glasses (e.g., AR/VR goggles), other similar devices adapted for AR, VR, MR, XR or other reality related technologies, or a combination of these devices. However, this disclosure is not limited thereto.

In one embodiment, the processor 110 may include, for example, a microcontroller unit (MCU), a central processing unit (CPU), a microprocessor, a digital signal processor (DSP), a programmable controller, a programmable logic device (PLD), other similar devices, or a combination of these devices. This disclosure is not limited thereto. In addition, in an embodiment, each of functions of the processor 110 may be achieved as multiple program codes. The program codes are stored in a memory, and executed by the processor 110. Alternatively, in an embodiment, each of the functions of the processor 110 may be achieved as one or more circuits. That is, this disclosure does not limit the use of software or hardware to achieve the functions of the processor 110.

In one embodiment, the display 120 may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the optical system 130 may include a lens and the optical distortion is at least partially induced by the lens. However, this disclosure is not limited thereto.

Figure 2:
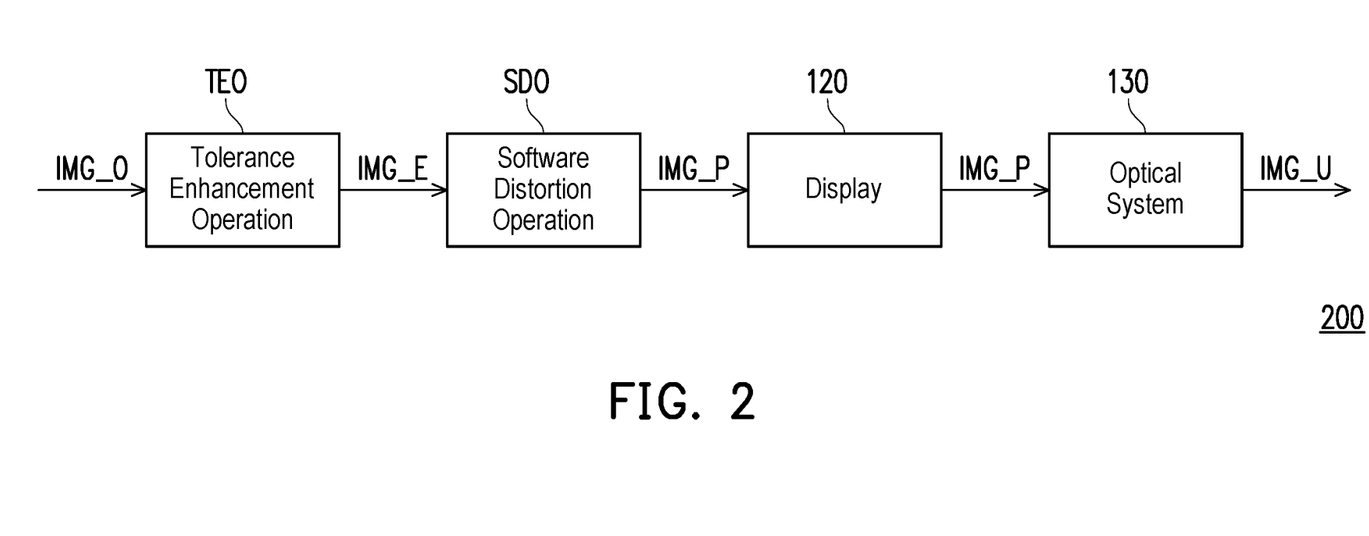
FIG. 2 is a schematic diagram of a software structure of a head-mounted display device according to an embodiment of the disclosure.

FIG. 2 is a schematic diagram of a software structure of a head-mounted display device according to an embodiment of the disclosure. With reference to FIG. 1 and FIG. 2, a software structure 200 of the HMD device 100 is depicted. The software structure 200 may include the tolerance enhancement operation TEO, the software distortion operation SDO, the display 120, and the optical system 130. The data involved in the software structure 200 may include an original image IMG_O, an enhanced image IMG_E, a pre-warp image IMG_P, and an undistorted image IMG_U.

It is noted that, the optical system 130 may include a lens and the lens may cause an optical distortion to the original image IMG_O, which is the image intended to display to the user through a panel of the display 120 and the optical system 130. Therefore, in order to compensate the optical distortion caused by the lens of the optical system 130, the software distortion operation SDO may be utilized to apply a software distortion. The software distortion may be an inverse of the optical distortion. In other words, while both of the software distortion and the optical distortion are applied, the software distortion and the optical distortion may compensate each other. However, since two distortions (i.e., the software distortion and the optical distortion) are applied, the quality of the image may be also reduced.

In order to bring back the loss of quality lost due to the two distortions, the tolerance enhancement operation TEO may be performed on the original image IMG_O. The tolerance enhancement operation TEO may be configured to increase a tolerance to a distortion of the original image IMG_O. For example, it is assumed that a score of the quality of the original image IMG_O may be 100 and a score of the quality of an image after the two distortions (e.g., the undistorted image IMG_U) may be 80. That is, the score of the quality may decrease by 20 points. By performing the tolerance enhancement operation TEO on the original image IMG_O, a score of the quality of the enhanced image IMG_E may be 120. Therefore, even if the two distortion are applied on the enhanced image IMG_E (i.e., the score of the quality may decrease by 20 points), a score of the quality of the undistorted image IMG_U may still be 100.

In this manner, since the original image IMG_O is enhanced by the tolerance enhancement operation TEO, the quality of the image displayed to the user (i.e., the undistorted image IMG_O) may be almost the same as the quality of the original image IMG_O. That is, the undistorted image IMG_O may be displayed to the user while the quality of the image does not reduce significantly, thereby improving the user experience.

Figure 3A:
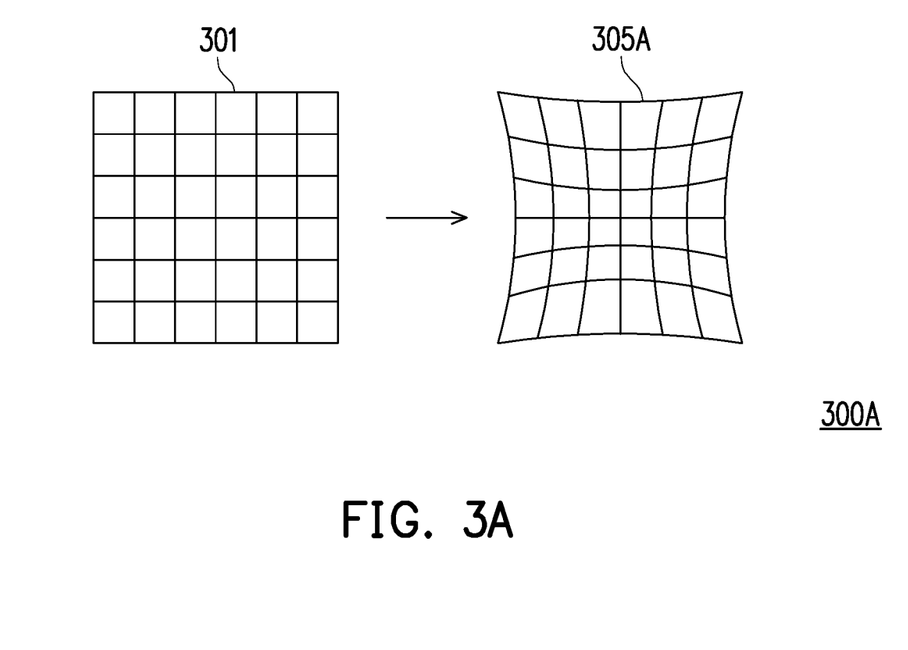
FIG. 3A is a schematic diagram of a display scenario of a head-mounted display device according to an embodiment of the disclosure.

FIG. 3A is a schematic diagram of a display scenario of a head-mounted display device according to an embodiment of the disclosure. With reference to FIG. 3A, a display scenario 300A depict a distortion of an image caused by a lens.

In order to reduce the size and weight of a VR device (e.g., the HMD device 100), a relatively small area display device may be are used and placed at a relatively close distance to the eyes of a user. In such a small area and close-range display hardware setup, the usability and comfort of the VR device must still be taken into account. Therefore, it is necessary to use optical lenses. The function of the optical lenses is to project the image of a close-range display device into a far-range magnified virtual image. With the help of optical lenses, the direction of light propagation is deviated, so that the image of the close-range display device is focused on the retina, and a virtual image is formed in the distance. In this way, the user can clearly see the image from the close-range display device when the crystalline lens of the eye remains relaxed, as if the displayed image is presented in the distance.

However, while the virtual image is formed in the distance through an optical lens, the virtual image must have a magnification effect, thus producing a pincushion distortion. For example, after an image 301 passes through the optical lens, the image 301 may be distorted and become an image 305A.

Figure 3B:
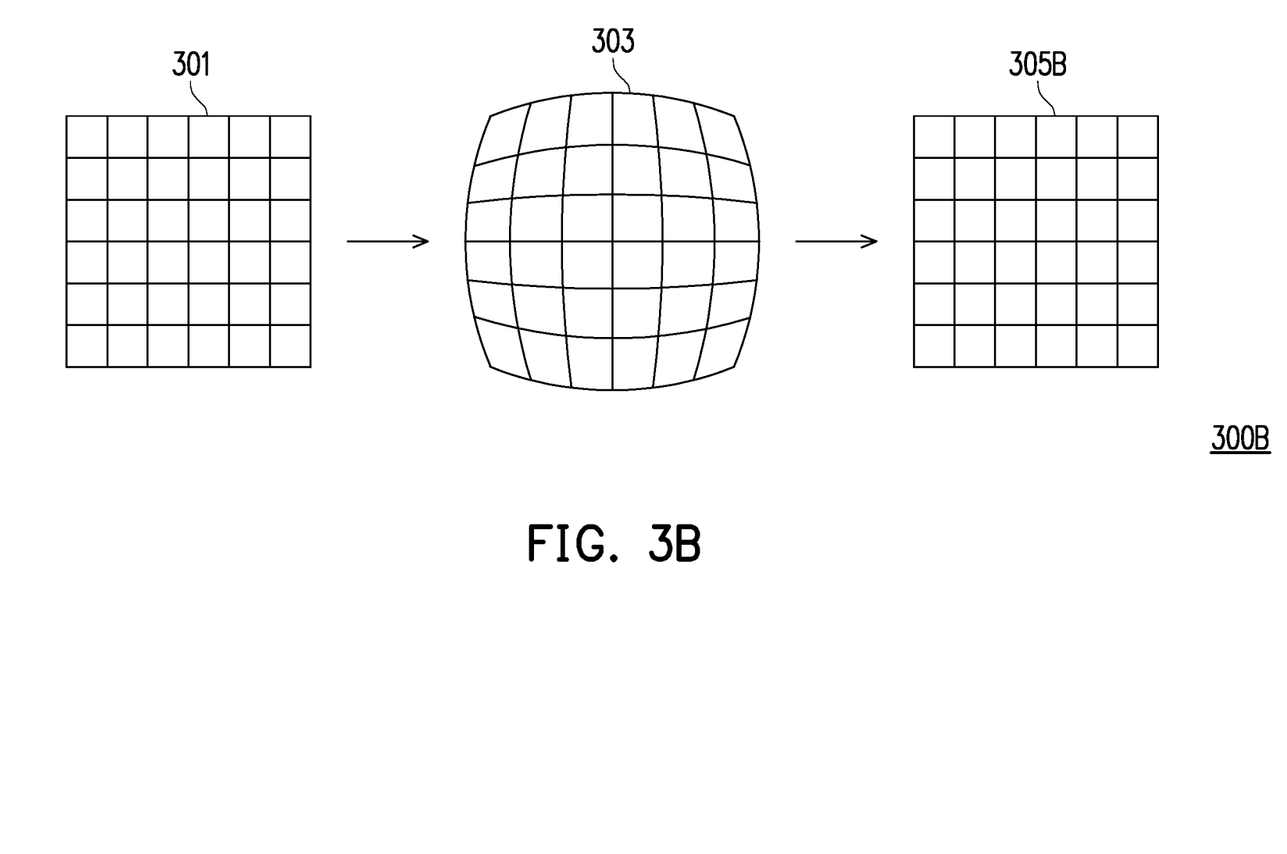
FIG. 3B is a schematic diagram of a display scenario of a head-mounted display device according to an embodiment of the disclosure.

FIG. 3B is a schematic diagram of a display scenario of a head-mounted display device according to an embodiment of the disclosure. With reference to FIG. 3B, a display scenario 300B depict a distortion of an image caused by the software and a distortion of an image caused by a lens.

Although it is theoretically possible to design an optical lens that perfectly generates an undistorted virtual image. However, limited by the cost and volume of the VR device, the VR imaging system of the VR device generally uses an optical lens with a distortion, and is equipped with lens distortion correction software to correct the distorted virtual image. The lens distortion correction software may be configured to correct the distorted virtual image produced by the optical lens by utilizing the complementary characteristics of a barrel distortion and a pincushion distortion. First of all, the lens distortion correction software may be configured to analyze the pincushion distortion image produced by the lens. In addition, the lens distortion correction software may be configured to calculate a barrel distortion model complementary to the pincushion distortion image. Then, the calculated barrel distortion model may be applied to an undistorted image originally to be presented on a display device, thereby converting it into a barrel distortion image, and then output the barrel distortion image on the display device. That is, the image after applying the barrel distortion model may be displayed on the panel of the display device, and then pass through the lens. In other words, referring to FIG. 2, the software distortion of the software distortion operation SDO may be a barrel distortion and the optical distortion of the optical system 140 may be a pincushion distortion. In this way, an undistorted image IMG_U as the original image IMG_O may display to the user.

Referring to FIG. 3B, an image 301 which is intended display to the user may be barrel distorted and become an image 303. Then, the image 303 may be pincushion distorted and become an image 305B. It should be noted that, a pincushion distortion and a barrel distortion may produce non-proportional distortion on a periphery of the image 301 and a center of the image 301. For example, a pincushion distortion may enlarge the peripheral parts of the image 301 much more than the central part of the image 301. On the other hand, a barrel distortion may shrink the peripheral part of the image 301 much more than the central part of the image 301. That is to say, if the barrel distortion is applied to the image 301, and the pincushion distortion of the lens is used to restore the barrel distortion to the image 301, then the peripheral part of the image 301 will undergo a drastic process of first shrinking and then enlarging. This process may greatly degrade the details of the peripheral part of the image 301, causing the user to clearly feel the blurring of the peripheral part of the image 305B.

In order to remain the details of the peripheral part of the image 301 after the distortions, a tolerance enhancement operation TEO may be performed on the image 301. It is noted that, while a user try to recognize an object in the image 305B, the shape of the object plays the most critical role. For example, if the detail of the shape of an object of a peripheral part of the image 301 is lost during the distortions, the user may not be able to recognize the object of a peripheral part of the image 305B. Therefore, in order to increase the recognizability of an object in a peripheral part of the image 305B, the shape of the object in the peripheral part of the image 301 may be enhanced by sharpening an edge of the object in the peripheral part of the image 301. After the edge of the object in the peripheral part of the image 301 is sharpened, the object may have more tolerance to distortions. That is, after the edge of the object in the peripheral part of the image 301 is sharpened, the user may be able to recognize the object in the image 305B easily. In other words, since the critical information wasn't lost during the distortions, the user may still utilize the critical information to recognize the object. That is to say, the tolerance enhancement operation TEO may include a sharpening operation of an edge of a peripheral part of the original image IMG_O. However, this disclosure is not limited thereto.

On the other hand, instead of enhancing the critical information in the original image IMG_O, discarding unnecessary information and/or unimportant information may be also considered. That is, the unnecessary information and/or unimportant information may not be helpful while the user is trying to recognize an object in the image 305B. Even more, the unnecessary information and/or unimportant information may confuse the user while the user is trying to recognize an object in the image 305B. For example, while an object is a cloth or a pillar, compared with the sharp of the cloth or the pillar, a texture of the cloth or the pillar may not be necessary information or important information for the user to recognize the objection. Therefore, in order to increase the recognizability of an object in a peripheral part of the image 305B, the shape of the object in the peripheral part of the image 301 may be enhanced by blurring a texture of the object in the peripheral part of the image 301. After the texture of the object in the peripheral part of the image 301 is blurred, the object may have more tolerance to distortions. That is, after the texture of the object in the peripheral part of the image 301 is blurred, the user may be able to recognize the object in the image 305B based on the critical information only. In other words, since the unnecessary information and/or unimportant information won't interfere with the user's judgment, the user may only utilize the critical information to recognize the object. That is to say, the tolerance enhancement operation TEO may include a blurring operation of a texture of a peripheral part of the original image IMG_O. However, this disclosure is not limited thereto.

In one embodiment, both of the sharpening operation of the edge of the object and the blurring operation of the texture of the object may be performed, thereby increasing the recognizability of the object significantly. Moreover, the tolerance enhancement operation TEO In this manner, the user experience may be improved.

Figure 4A:
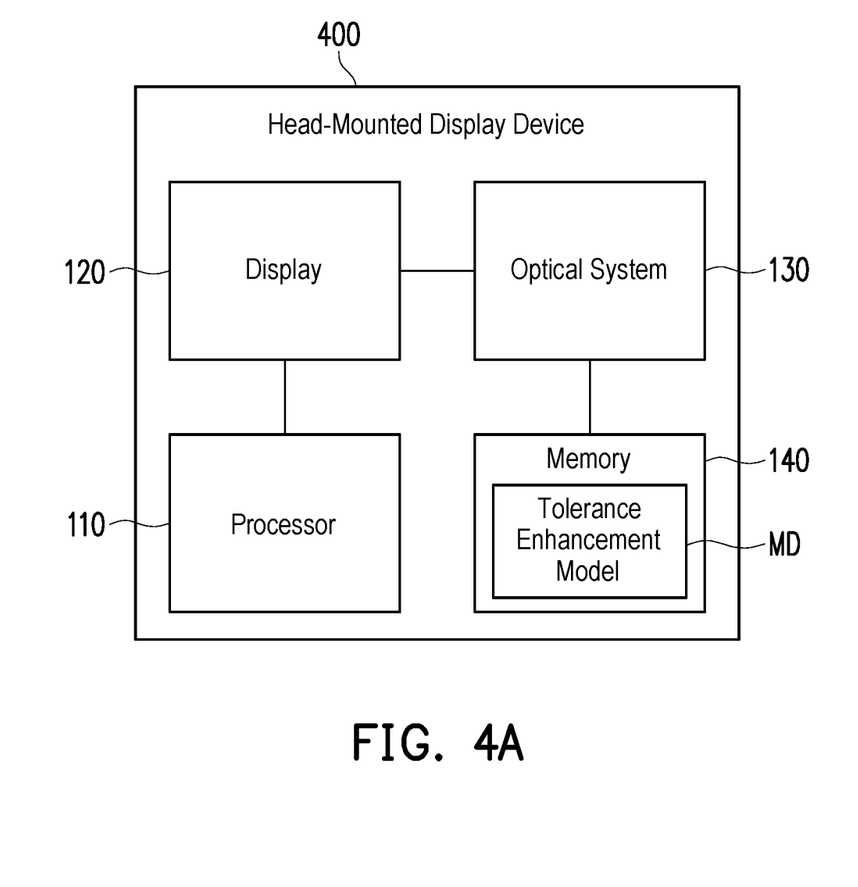
FIG. 4A is a schematic diagram of a hardware structure of a head-mounted display device according to an embodiment of the disclosure.

FIG. 4A is a schematic diagram of a hardware structure of a head-mounted display device according to an embodiment of the disclosure. With reference to FIG. 1 and FIG. 4A, a HMD device 400 may include similar hardware structure of the HMD device 100, while the HMD device 400 may further include a memory 140. The memory 140 may be configured to store a tolerance enhancement model MD.

In one embodiment, the processor 110 may be configured to perform the tolerance enhancement operation TEO based on the tolerance enhancement model MD. That is, the tolerance enhancement model MD may be utilized to enhance the tolerance to distortions of the original image IMG_O. Further, the tolerance enhancement model MD may be pre-trained utilizing a machine learning algorithm. However, this disclosure is not limited thereto.

In one embodiment, the memory 140 may include, for example, NAND flash memory cores, NOR flash memory cores, static random access memory (SRAM) cores, dynamic random access memory (DRAM) cores, magnetoresistive random access memory (MRAM) cores, Phase change memory (PCM) cores, resistive random access memory (ReRAM) cores, 3D XPoint memory cores, ferroelectric random-access memory (FeRAM) cores, and other types of memory cores that are suitable for storing data. However, this disclosure is not limited thereto.

Figure 4B:
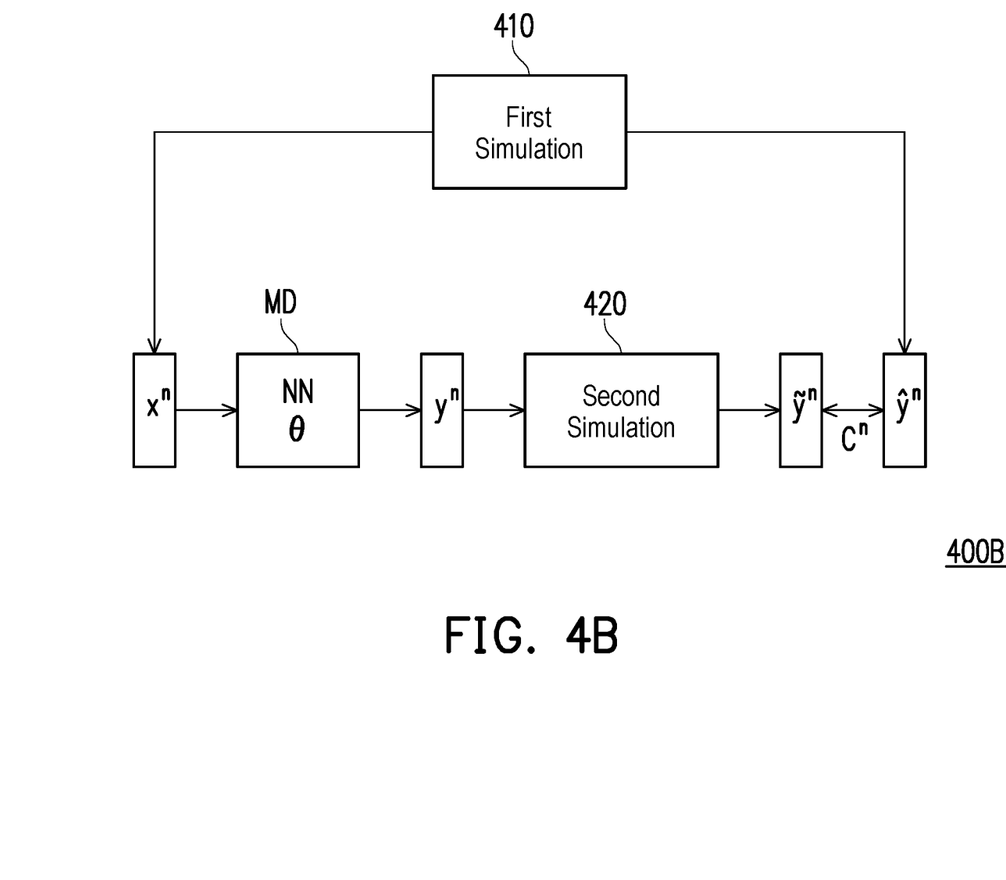
FIG. 4B is a schematic diagram of a training scenario of a tolerance enhancement model according to an embodiment of the disclosure.

FIG. 4B is a schematic diagram of a training scenario of a tolerance enhancement model according to an embodiment of the disclosure. With reference to FIG. 4A and FIG. 4B, a training scenario 400B depicts how a tolerance enhancement model may be trained.

Referring to FIG. 4B, $x''$ may represent n image eigenvalues of the original image IMG_O. The image eigenvalue may be a quantitative value extracted through image analysis that can be used to describe or distinguish the properties of an image. For example, the simplest method is to use the pixel value of the image as the feature value of the image. That is to say, $x''$ may represent n pixel values of the image. $\hat{y}''$ may also represent the eigenvalues of an image. The image corresponding to $\hat{y}''$ may be an ideal image for simulating the visual experience received by the user through the VR optical imaging system (e.g., the display 120 and the optical system 130). In one embodiment, a method of simulating an ideal image received through a VR optical imaging system may be performing a first simulation 410 on the original image IMG_O. For example, the first simulation 410 may be moderately blurring the original image IMG_O by using a low pass filter, but this disclosure is not limited thereto. Next, the eigenvalues $\hat{y}''$ may be extracted from the simulated ideal image.

In order to train the tolerance enhancement model MD, the eigenvalues $x''$ may be used as the input and the output may be the eigenvalues $y''$. In one embodiment a neural network NN in the tolerance enhancement model MD may be utilized to process an input (e.g., the eigenvalues $x''$), output a result (e.g., the eigenvalues $y''$), and generate a training parameter θ based on the input and the output. The training parameter θ may be applied to the neural network NN to transfer the eigenvalues $x''$ to the eigenvalues $y''$. Then, a second simulation 420 may be used to simulate a process of an image passing through an optical lens. The eigenvalues $y''$ may be an input of the second simulation 420 and eigenvalues $\tilde{y}''$ may be an output of the second simulation 420. The image corresponding to $\tilde{y}''$ may be a simulated image of the undistorted image IMG_U.

By training the neural network NN iteratively, the simulated image may be brought closer to the ideal image. For example, in order to make the eigenvalues $\tilde{y}''$ as close as possible to the eigenvalues $\hat{y}''$, a mathematical method of optimization can be used to find the training parameter θ. The process of finding the training parameter θ may use recursive optimization. That is to say, a difference $C''$ between eigenvalues $\tilde{y}''$ and the eigenvalues $\hat{y}''$ is continuously fed back to the neural network NN as a basis for gradually modifying the parameter θ until the difference $C''$ meets the expected standard. In other words, the tolerance enhancement model MD may be pre-trained utilizing a machine learning algorithm based on a comparison of an ideal image of the original image IMG_O and a simulated image of the enhanced image IMG_E. Further, the ideal image may be an output of a low pass filter and the original image IMG_O may be an input of the low pass filter. Furthermore, the simulated image may be a simulation result of a process of the enhanced image IMG_E passing through the optical system 130. However, this disclosure is not limited thereto.

After the tolerance enhancement model MD is pre-trained, the tolerance enhancement model MD may be stored in the memory 140 of the HMD device 400. Therefore, the processor 110 may be configured to perform the tolerance enhancement operation TEO based on the tolerance enhancement model MD.

In this manner, since the original image is enhanced by the tolerance enhancement operation based on the tolerance enhancement model MD, the quality of the image displayed to the user (i.e., the undistorted image) may be almost the same as the quality of the original image. That is, the undistorted image may be displayed to the user while the quality of the image does not reduce significantly, thereby improving the user experience.

Figure 5:
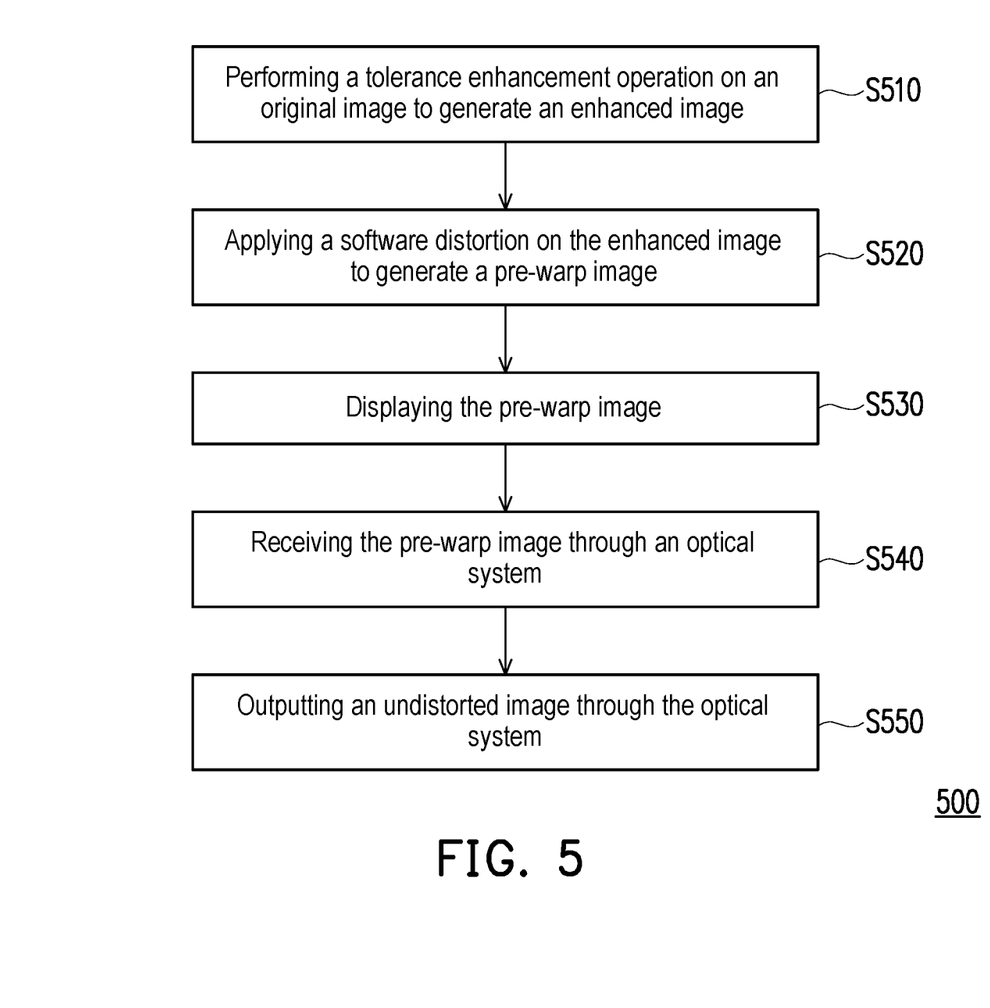
FIG. 5 is a schematic flowchart of a display method of a head-mounted display device according to an embodiment of the disclosure.

FIG. 5 is a schematic flowchart of a display method of a head-mounted display device according to an embodiment of the disclosure. With reference to FIG. 1 to FIG. 5, a display method 500 of the HMD device 100 may include a step S510, a step S520, a step S530, a step S540, and a step S550.

In the step S510, the tolerance enhancement operation TEO may be performed, by the processor 110, on the original image IMG_O to generate the enhanced image IMG_E. In the step S520, the software distortion may be applied, by the processor 110, on the enhanced image IMG_E to generate the pre-warp image IMG_P. In the step S530, the pre-warp image IMG_P may be displayed by the display 120. In the step S540, the pre-warp image IMG_P may be received through the optical system 130. In the step S550, the undistorted image may be outputted through the optical system 130.

In this manner, the undistorted image may be displayed to the user while the quality of the image does not reduce significantly, thereby improving the user experience.

In addition, the implementation details of the display method 500 may be referred to the descriptions of FIG. 1 to FIG. 4 to obtain sufficient teachings, suggestions, and implementation embodiments, while the details are not redundantly described seriatim herein.

In summary, according to the HMD device 100 and the display method 500, since the original image IMG_O is enhanced by the tolerance enhancement operation TEO, the quality of the image displayed to the user (i.e., the undistorted image IMG_U) may be almost the same as the quality of the original image IMG_P. That is, the undistorted image IMG_U may be displayed to the user while the quality of the image does not reduce significantly, thereby improving the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heads mounted display (HMD) device, comprising:
a display, configured to display a pre-warp image;
an optical system, configured to receive the pre-warp image and output an undistorted image; and
a processor, configured to:
generate an original image, wherein the original image comprises a regular grid of regions of pixels;
perform a tolerance enhancement operation on the original image to generate an enhanced image; and
apply a software distortion on the enhanced image to generate the pre-warp image, wherein the software distortion is configured to compensate an optical distortion of the optical system.

2. The HMD device according to claim 1, wherein the optical system comprises a lens and the optical distortion is at least partially induced by the lens.

3. The HMD device according to claim 1, wherein the software distortion is a barrel distortion and the optical distortion is a pincushion distortion.

4. The HMD device according to claim 1, wherein the tolerance enhancement operation comprises a sharpening operation of an edge of a peripheral part of the original image.

5. The HMD device according to claim 1, wherein the tolerance enhancement operation comprises a blurring operation of a texture of the peripheral part of the original image.

6. The HMD device according to claim 1, wherein the tolerance enhancement operation comprises a sharpening operation of an edge of a peripheral part of the original image and a blurring operation of a texture of the peripheral part of the original image.

7. The HMD device according to claim 1, further comprising:
a memory, configured to store a tolerance enhancement model, wherein
the processor is further configured to perform the tolerance enhancement operation based on a tolerance enhancement model.

8. The HMD device according to claim 7, wherein the tolerance enhancement model is pre-trained utilizing a machine learning algorithm based on a comparison of an ideal image of the original image and a simulated image of the enhanced image.

9. The HMD device according to claim 8, wherein the ideal image is an output of a low pass filter and the original image is an input of the low pass filter.

10. The HMD device according to claim 8, wherein the simulated image is a simulation result of a process of the enhanced image passing through the optical system.

11. A display method of a head-mounted display (HMD) device, comprising:
generating an original image, wherein the original image comprises a regular grid of regions of pixels;
performing a tolerance enhancement operation on the original image to generate an enhanced image;
applying a software distortion on the enhanced image to generate a pre-warp image, wherein the software distortion is configured to compensate an optical distortion of the optical system;
displaying the pre-warp image;
receiving the pre-warp image through an optical system; and
outputting an undistorted image through the optical system.

12. The display method according to claim 11, wherein the optical system comprises a lens and the optical distortion is at least partially induced by the lens.

13. The display method according to claim 11, wherein the software distortion is a barrel distortion and the optical distortion is a pincushion distortion.

14. The display method according to claim 11, wherein the tolerance enhancement operation comprises a sharpening operation of an edge of a peripheral part of the original image.

15. The display method according to claim 11, wherein the tolerance enhancement operation comprises a blurring operation of a texture of the peripheral part of the original image.

16. The display method according to claim 11, wherein the tolerance enhancement operation comprises a sharpening operation of an edge of a peripheral part of the original image and a blurring operation of a texture of the peripheral part of the original image.

17. The display method according to claim 11, further comprising:
performing the tolerance enhancement operation based on a tolerance enhancement model.

18. The display method according to claim 17, further comprising:
pre-training the tolerance enhancement model utilizing a machine learning algorithm based on a comparison of an ideal image of the original image and a simulated image of the enhanced image.

19. The display method according to claim 18, wherein the ideal image is an output of a low pass filter and the original image is an input of the low pass filter.

20. The display method according to claim 18, wherein the simulated image is a simulation result of a process of the enhanced image passing through the optical system.

* * * * *